United States Patent [19]

Garbo

[11] Patent Number: 5,372,007

[45] Date of Patent: Dec. 13, 1994

[54] EXPANDING HIGH-PRESSURE FUEL GAS AND STEAM IN A TURBINE TO DRIVE AN ELECTRIC GENERATOR BEFORE BURNING THE GAS TO MAKE STEAM

[76] Inventor: Paul W. Garbo, 48 Lester Ave., Freeport, N.Y. 11520

[21] Appl. No.: 136,365

[22] Filed: Oct. 15, 1993

[51] Int. Cl.⁵ ............................................. F01K 21/04
[52] U.S. Cl. ........................................ 60/649; 60/572
[58] Field of Search ................ 60/649, 685, 672, 671

[56] References Cited

U.S. PATENT DOCUMENTS 3,959,972  6/1976  Rudolph et al. ................ 60/672
4,439,988  4/1984  Minardi et al. ................. 60/649

*Primary Examiner*—Ira S. Lazarus
*Assistant Examiner*—L. Heyman
*Attorney, Agent, or Firm*—Paul W. Garbo

[57] ABSTRACT

The generation of electricity via a steam turbine-driven generator is improved by mixing high-pressure fuel gas with the steam supplied to the turbine. The turbine discharge is separated into gas and steam condensate. The gas is burned to convert the condensate into the steam supplied to the turbine. Maximum benefits of such operation are attained by conducting the combustion of the separated gas with a porous fiber burner to suppress the formation of air pollutants.

23 Claims, 1 Drawing Sheet

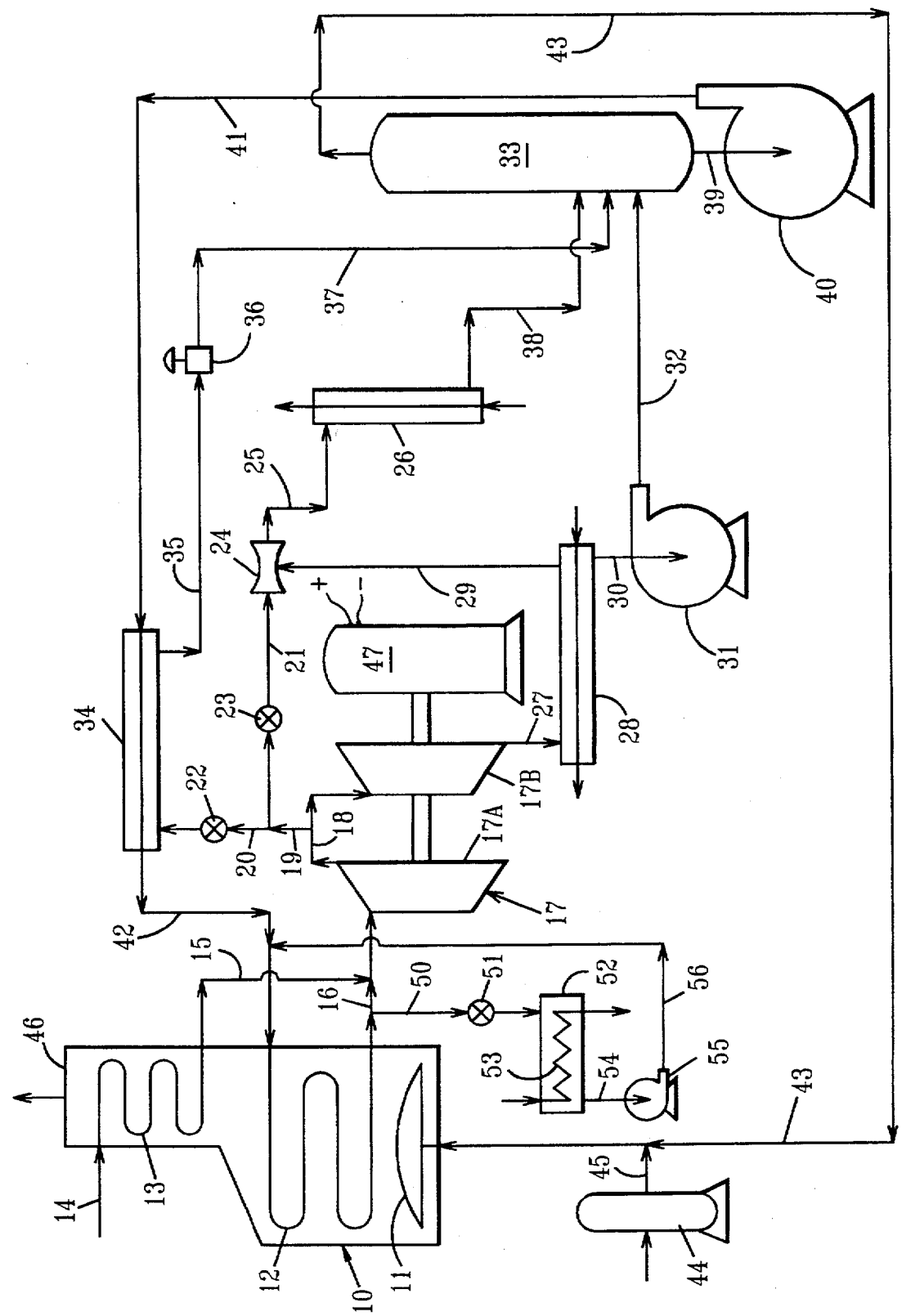

EXPANDING HIGH-PRESSURE FUEL GAS AND STEAM IN A TURBINE TO DRIVE AN ELECTRIC GENERATOR BEFORE BURNING THE GAS TO MAKE STEAM

BACKGROUND OF THE INVENTION

This invention relates to the generation of electricity by the isentropic expansion of high-pressure fuel gas and steam. More particularly, the invention involves expansion of the fuel gas admixed with steam in a steam turbine to drive an electric generator, the steam being produced by burning the expanded fuel gas, preferably in a manner that yields minimal air pollution.

Processes for generating electricity by the combustion of high-pressure fuel gas are unable to meet the increasingly lower limits imposed by government regulations on the air pollutants: nitrogen oxides ($NO_x$), carbon monoxide (CO) and unburned hydrocarbons (UHC), that are discharged into the atmosphere with the combustion product gases. Such processes frequently are made to comply with the regulations by passing the combustion product gases through a treatment plant that removes the pollutants before the gases are vented. Other such processes employ catalysts or unusual combustion conditions to suppress the formation of pollutants. All the remedial techniques increase the cost of generating electricity.

Currently popular schemes for generating electricity by the combustion of high-pressure fuel gas are based on the use of gas turbines which have gaseous effluents with high contents of $NO_x$, CO and UHC. Various efforts are being made to find ways to bring the operation of gas turbines into compliance with environmental regulations.

However, a principal object of this invention is to avoid the use of gas turbines in the generation of electricity by substituting steam turbines therefor.

A related principal object is to eliminate the use and cost of a turbo-expander to expand high-pressure fuel gas by mixing the gas with steam that is passed through a steam turbine.

A further object is to carry out the combustion of the expanded fuel gas to produce the steam passed through the turbine, by passage through a porous fiber burner and effecting flameless combustion on the exposed surface of the burner to minimize the formation of $NO_x$, CO and UHC.

These and other features and advantages of the invention will be evident from the description which follows.

SUMMARY OF THE INVENTION

In accordance with this invention, a mixture of high-pressure fuel gas and steam is passed through a steam turbine that drives an electric generator, the resulting expanded mixture is separated into a water-condensate stream that is recirculated to a steam boiler, and a fuel gas stream that is burned to heat the boiler. Preferably, a porous fiber burner is used to burn the fuel gas.

Principally, the fuel gas is pipeline natural gas at pressures of a least about 400 psia (pounds per square inch absolute). Other pressurized fuel gases include ethane and propane.

Preferably, the combustion of the expanded (reduced pressure) fuel gas to minimize the formation of $NO_x$, CO and UHC is conducted by passing the fuel gas admixed with air through a porous fiber burner to effect radiant flameless combustion on the outer surface of the fiber layer of the burner. Another feature of combustion with a porous fiber burner is the low amount of excess air that will yield combustion product gases having a very low content of those air pollutants, namely, not more than about 20 ppm (parts per million) $NO_x$, 30 ppm CO and 10 ppm UHC. Generally, the amount of the excess air is not more than about 25% in excess of the stoichiometric requirement but preferably is not more than about 15%.

The porous fiber burner has undergone considerable development since it was early disclosed in U.S. Pat. Nos. 3,179,156 and 3,275,497 to Weiss et al. Improvements and modifications of the porous fiber burner are described in U.S. Pat. No. 3,383,159 to Smith and U.S. Pat. No. 4,746,287 to Lannutti. Additional variations of this type of burner are presented in U.S. Pat. No. 3,697,447 to Bettinardi and U.S. Pat. No. 4,597,734 to McCausland et al. The porous fiber burner used in this invention is the burner of any of the aforesaid patents as well as any other porous fiber burner known by those skilled in combustion to suppress the formation of air pollutants. The burner of the Smith patent containing powdered aluminum or that of aforesaid Lannutti patent containing powdered aluminum alloy is preferred for this invention.

A unique feature of this invention is the isentropic expansion of pipeline fuel gas by mixing it with high-pressure steam and passing the mixture through a steam turbine that drives an electric generator. Thus, the energy in the pressurized gas is converted into electricity without requiring a turbo-expander coupled to an electric generator in addition to the steam turbine-generator unit required to convert high-pressure steam produced with the combustion energy of the fuel gas into electricity. In short, the invention provides a simplified plant having a single generator driven by a turbine that utilizes both the pressure energy and the combustion energy of the fuel gas.

The compact power plant of this invention, because of its simplicity, has the economic advantage of a low capital investment. This advantage is particularly attractive for small plants having an electric generating capacity of not more than about 15,000 KW (kilowatts).

BRIEF DESCRIPTION OF THE DRAWING

For a fuller understanding of the invention, the further description will refer to the appended drawing which is a diagrammatic representation of an unusually simplified electric power plant operable in accordance with the invention to substantially curtail air pollution.

DESCRIPTION OF A PREFERRED EMBODIMENT

The description of the novel power plant will include data of a specific example of operating the plant. The chosen locale of the plant is supplied with natural gas at a pipeline pressure of 620 pounds per square inch absolute (psia) and temperature of 60° F. The gas has a low heating value of 930 British Thermal Units per standard cubic foot and the usual content of moisture in pipeline gas. Available cooling water has a maximum temperature of 85° F. The steam turbine selected for the plant has an 83% efficiency and the electric generator has a 98% efficiency. The plant is designed for a boiler feed water rate of 100,000 pounds per hour; the feed water is preheated to 300° F.

The appended flowsheet shows furnace 10 with three principal components: porous fiber burner 11, steam boiler 12 and gas preheater 13. The natural gas at 620 psia and 60° F. is fed by line 14 to preheater 13 at the hourly rate of 123,520 standard cubic feet. The hot gas at 750° F. leaves preheater 13 through line 15 and is mixed in the line 16 with superheated steam having a pressure of 600 psia and a temperature of 750° F. Operators of steam turbines know that superheating the steam improves the performance efficiency of the turbine. In each case, the operator sets the amount of superheat based on the goals and operating conditions of his plant. In the operation of this invention, the chosen amount of steam superheat will frequently be in the range of about 250° F. to 300° F.

The gas-steam mixture enters the first stage 17A of steam turbine 17 wherein the pressure is reduced to 80 psia. Slightly more than 78% of the expanded mixture discharging into line 18 enters the second stage 17B or turbine 17. Nearly 22% of the partially expanded mixture is diverted from line 18 by line 19 which provides flow to lines 20 and 21 having control valves 22 and 23, respectively. Nearly 20% of the partially expanded gas-steam mixture flows through line 21, ejector 24 and line 25 into water-cooled condenser 26.

The bulk of the gas-steam mixture expanded in the second stage 17B of turbine 17 discharges via line 27 into water-cooled condenser 28 which is maintained at a pressure of 0.1 atmosphere by suction line 29 extending from condenser 28 to ejector 24. The condensing temperature is 134° F. The gaseous phase (moist natural gas) of the resulting gas-condensate mixture in condenser 28 is sucked through line 29 by ejector 24 and discharged via line 25, condenser 26 and line 38 into separator 33. The liquid phase (water) in condenser 28 flows through line 30 and is fed by pump 31 and line 32 to gas-liquid separator 33 maintained at slightly above atmospheric pressure.

About 2% of the partially expanded gas-steam mixture from first stage 17A is supplied by line 20 and control valve 22 to heat exchanger 34 wherein recirculated boiler feed water is preheated to 300° F. The gas-steam mixture passing through exchanger 34 flows through line 35 and pressure-reducing valve 36 and discharges via line 37 into separator 33. The gas-steam mixture flowing through ejector 24 and line 25 into condenser 26 discharges therefrom via line 38 into separator 33.

All of the water collecting in the lower end of separator 33 flows through line 39 to pump 40 which raises the pressure of the water to about 620 psia so that it will flow through line 41, preheater 34 and line 42 into steam boiler 12, thus completing the feed water-steam cycle portion of the plant.

The natural gas rising to the top of separator 33 passes therefrom via line 43 to porous fiber burner 11. The pressure in separator 33 is maintained slightly above atmospheric pressure to ensure the flow of gas to and through burner 11. Before entering burner 11, combustion air supplied by blower 44 and line 45 is admixed with the gas in line 43 in an amount that is 15% in excess of the stoichiometric requirement. The surface combustion carried out with porous fiber burner 11 containing powdered aluminum as taught by the aforementioned Smith patent produces a high proportion of infrared energy that is effectively directed to steam boiler 12 while yielding combustion product gases or flue gas containing only about 10 ppm $NO_x$, 16 ppm CO and 4 ppm UHC. The flue gas exits the top 46 of furnace 10 at a temperature of about 200° F.

The work performed by two-stage steam turbine 17 is utilized to drive electric generator 47 which delivers 10,368 KW of electric power. The overall thermal efficiency (TE) of the operation is 31.8%.

As is frequently done, particularly in small power plants, the pressure of pipeline gas is decreased by passing the gas through a pressure-reducing valve so that the potential energy of the high-pressure gas is wasted.

Comparing the specific example of the invention with an operation involving the same steam cycle of the flowsheet except that the pipeline gas is passed through a pressure-reducing valve and flows directly to the burner, the power generated by such operation is 9,786 KW. Therefore, by expanding the pipeline gas together with steam in a turbine pursuant to the illustrative example of the invention, the power output was increased nearly 6% to 10,368 KW. This increase of power output becomes all the more economically attractive when it is realized that the investment for attaining this power increase is the relatively small cost of gas preheater 13 and line 15 connecting it with steam line 16.

Assuming that the aforesaid natural gas was available at a higher pressure of 920 psia or at a lower pressure of 420 psia then the inlet conditions of the gas-steam mixture entering first stage 17A of turbine 17 would be 900 psia and 900° F. or 400 psia and 650° F., respectively. The hourly feed rate of gas at 920 psia would be 131,530 standard cubic feet and that of gas at 420 psia would be 118,580 standard cubic feet. The results of these two additional examples are compared with the results of the first example (in every example the boiler water feed rate is 100,000 pounds per hour). The comparison includes in each case passing only steam through the turbine as well as passing the mixture of natural gas and steam through the turbine. The results are tabulated below to facilitate comparisons.

| Steam Conditions | Steam Only | | Gas & Steam | | TE Gain |
| --- | --- | --- | --- | --- | --- |
| | KW | TE | KW | TE | |
| 900 psia 900° F. | 11,409 | 32.9% | 12,098 | 34.9% | 6.08% |
| 600 psia 750° F. | 9,786 | 30.0% | 10,368 | 31.8% | 6.00% |
| 400 psia 650° F. | 8,291 | 26.5% | 8,764 | 28.0% | 5.66% |

It is evident that at 900 psia the 34.9% thermal efficiency (TE) of the operation pursuant to the invention is 6.08% greater than the 32.9% thermal efficiency of the operation when steam alone is passed through the turbine. The thermal efficiency gain decreases slightly as the steam pressure is dropped even to 400 psia. The increase in power output in the 900 psia case from 11,409 KW to 12,098 KW achieved by the invention is 6.04%; this increase gradually diminishes as the steam pressure falls so that at 400 psia the power gain from 8291 KW to 8764 KW is still 5.70%.

It is therefore evident that expanding pipeline gas together with steam in a steam turbine rather than passing the gas through a reducing valve and passing only steam through the turbine increases the power output as well as the thermal efficiency by about 6% at all usual pipeline pressures.

There are many existing power plants, usually associated with manufacturing facilities, where the pressure of pipeline gas is dropped by passage through a reducing valve before it is burned to produce steam. Such plants can be advantageously retrofitted in accordance with this invention; the resulting approximately 6% gain in power output and thermal efficiency would in relatively short time repay the retrofitting cost.

To obtain the full benefits of the invention, such retrofitting should include replacement of the burner with the porous fiber burner which excels in minimizing the formation of the pollutants $NO_x$, CO and UHC. However, the power and thermal efficiency gains can still be obtained with any reputable burner so long as the pipeline gas is introduced into the steam fed to the turbine. In short, the invention is based on the work-expansion expansion of pipeline gas mixed with steam and then the gas is preferably burned on the exposed surface of a porous fiber burner to produce abundant infrared energy and a flue gas having a very low content of $NO_x$, CO and UHC.

It is well known that the pressure energy of pipeline gas can be utilized by passing the gas through a turboexpander coupled to drive an electric generator or a refrigerant compressor. However, the cost of the turboexpander and electric generator or refrigerant compressor is not economically justified except in large power plants. Such separate work-expansion of natural gas also requires means for drying the gas to prevent ice formation in the expander and means for heating the gas to obtain efficient operation of the expander. Such means further increase the cost of separately work-expanding pipeline gas. Hence, in small power plants separately passing high-pressure natural gas through a turboexpander is not a practical alternative to the simple mixing of the gas with steam fed to a turbine.

An important extension of the invention is the cogeneration of electricity and heating steam required in manufacturing processes or in any of its other uses. Such cogeneration is readily accomplished by diverting some of the steam in line 16 into line 50 when control valve 51 is opened. The steam in line 50 flows into heat exchanger 52 where it provides heat to a fluid passing through coil 53. Steam condensate discharges from exchanger 52 via line 54 into pump 55 which recycles it through lines 56 and 42 to steam boiler 12.

The previously described example of the invention can be modified to cogenerate heating steam as well as electricity simply by diverting steam from line 16 into line 50 and exchanger 52. If the feed rate of natural gas through line 14 given in the example is not changed, the flow of the gas and steam mixture through turbine 17 will obviously be reduced as will also the electric output of generator 47. However, if the electric output is to be maintained unchanged, then the feed rate of natural gas must be increased by an amount adequate to produce the heating steam supplied to exchanger 52.

The cogeneration of electricity and steam pursuant to this invention will be attractive to large housing projects and shopping malls as well as to industrial operations such as chemical plants.

Variations and modifications of the invention will be apparent to those skilled in the art without departing from the spirit and scope of the invention. For example, gas preheater 13 need not be within furnace 10; a separate heat exchanger may be used to heat the natural gas with hot flue gas leaving top 46 of furnace 10. In fact, heat from an available extraneous source may be used to heat the pipeline gas. For simplicity, a single porous fiber burner 11 is shown in the flowsheet and there has been repeated mention of the porous fiber burner; however, despite such representation and expression it will be understood that the furnace will be usually equipped with a multiplicity of such burners supplied in parallel with a mixture of fuel gas and combustion air. Also, while steam turbine 17 is shown in the flowsheet as two units 17A and 17B connected in tandem, a single turbine with line 19 for partially expanded gas and steam connected at an intermediate pressure stage of the single turbine may be substituted for the tandem units. Accordingly, only such limitations should be imposed on the invention as are set forth in the appended claims.

What is claimed is:

1. The process of converting pipeline fuel gas into electricity, which comprises the expansion of said pipeline gas admixed with high-pressure steam by passage through a steam turbine that drives an electric generator, cooling the expanded mixture to condense steam, separating the resulting gas-condensate mixture into a gas phase and an aqueous liquid phase, feeding said aqueous phase to a boiler, and burning said gas phase to heat said boiler to produce said high-pressure steam.

2. The process of claim 1 wherein a minor portion of the mixture of gas and steam after only partial expansion is passed through an ejector connected to a condenser to maintain a subatmospheric pressure therein, and the major portion of the fully expanded mixture flows from the steam turbine into said condenser.

3. The process of claim 1 where in a minor portion of the mixture of gas and steam after only partial expansion is passed in indirect heat exchange with the aqueous liquid phase fed to the boiler.

4. The process of claim 1 wherein the pipeline gas is preheated to substantially the temperature of the steam prior to admixture therewith.

5. The process of claim 2 wherein the pipeline gas is preheated prior to admixture with the steam, and a minor portion of the mixture of gas and steam after only partial expansion is passed in indirect heat exchange with the aqueous liquid phase fed to the boiler.

6. The process of generating electricity from high-pressure fuel gas by way of minimal polluting combustion of said gas, which comprises forming a high-pressure mixture of said gas and steam, passing said mixture through a steam turbine that drives an electric generator, cooling said mixture after expansion in said turbine to condense the water vapor in said expanded mixture, separating water condensate from said gas in said cooled mixture, feeding said condensate to a boiler to produce high-pressure steam used to form said high-pressure mixture, feeding said gas separated from said condensate together with combustion air to a porous fiber burner to effect surface combustion of said gas and yield a flue gas containing not more than about 20 ppm $NO_x$, 30 ppm CO and 10 ppm UHC, and using the heat of said combustion to heat said boiler.

7. The process of claim 6 wherein the high-pressure fuel gas has a pressure of at least about 400 psia and is preheated to a temperature of at least 650° F. before it is mixed with high-pressure steam.

8. The process of claim 6 wherein the combustion air is controlled to an amount not more than 25% in excess of the stoichiometric requirement, and the porous fiber burner contains a small amount of aluminum or aluminum alloy as a fine powder uniformly distributed therein.

9. The process of claim 6 wherein the fully expanded mixture discharges from the steam turbine into a condenser maintained at subatmospheric pressure, and a minor portion of the mixture passing through said turbine is withdrawn when only partially expanded and is passed through an ejector connected to said condenser to maintain said subatmospheric pressure therein.

10. The process of claim 6 wherein a portion of the high-pressure steam produced with the combustion heat of the fuel gas is passed in heat exchange relation with a fluid requiring heat, and the water condensate resulting from said heat exchange is fed to the boiler producing said high-pressure steam.

11. The process of claim 6 wherein the high-pressure fuel gas has a pressure of at least about 600 psia, the porous fiber burner contains a small amount of aluminum or aluminum alloy as a fine powder uniformly distributed therein, and the combustion air is controlled to an amount not more than 15% in excess of the stoichiometric requirement.

12. The process of claim 11 wherein the fully expanded mixture discharges from the steam turbine into a condenser maintained at subatmospheric pressure, and a minor portion of the mixture passing through said turbine is withdrawn when only partially expanded and is passed through an ejector connected to said condenser to maintain said subatmospheric pressure therein.

13. The process of claim 12 wherein a portion of the high-pressure steam produced with the combustion heat of the fuel gas is passed in heat exchange relation with a fluid requiring heat, and the water condensate resulting from said heat exchange is fed to the boiler producing said high-pressure steam.

14. A system for converting high-pressure fuel gas into electricity by way of work-expansion of said gas followed by combustion thereof to produce high-pressure steam to operate a steam turbine-driven electric generator, which comprises:

(1) a boiler for the production of high-pressure steam;
(2) a steam turbine;
(3) means for mixing and introducing high-pressure fuel gas and steam from said boiler (1) into said turbine (2);
(4) an electric generator driven by said turbine (2);
(5) condensing means connected to receive the expanded mixture discharged from said turbine (2) as a gas-condensate mixture;
(6) a gas-liquid separator connected to said condensing means (5) to separate the gas-condensate mixture flowing from said condensing means (5);
(7) means for passing condensate from said gas-liquid separator (6) to said boiler (1) for the production of said high-pressure steam;
(8) burner positioned to heat said boiler (1); and
(9) means for passing gas from said gas-liquid separator (6) together with combustion air to said burner (8).

15. The system of claim 14 which includes a heat exchanger connected to receive a portion of the steam produced in boiler (1), and means for returning steam condensate from said heat exchanger to said boiler (1).

16. The system of claim 14 which includes a preheater for the condensate passing from gas-liquid separator (6) to boiler (1), and an ejector connected to maintain a subatmospheric pressure in condensing means (5), said ejector being connected to receive partially expanded gas and steam from turbine (2).

17. The system of claim 14 wherein gas burner (8) is a porous fiber burner.

18. The system of claim 17 which includes an ejector connected to maintain a subatmospheric pressure in condensing means (5), said ejector being connected to receive partially expanded gas and steam from turbine (2).

19. The system of claim 17 which includes a heat exchanger connected to receive a portion of the steam produced in boiler (1), and means for returning steam condensate from said heat exchanger to said boiler (1).

20. The system of claim 19 wherein the porous fiber burner contains a small amount of aluminum or aluminum alloy as a fine powder uniformly distributed therein.

21. In the generation of electricity involving the reduction of pressure of pipeline fuel gas prior to combustion to produce high-pressure steam that is passed through a steam turbine to drive an electric generator, the improvement which compromises passing said pipeline fuel gas mixed with said high-pressure steam through said turbine, thereafter separating said fuel gas from condensate of said steam, and burning the separated fuel gas to convert said condensate into said high-pressure steam.

22. The improvement of claim 21 wherein the combustion of the separated fuel gas is conducted with a porous fiber burner.

23. The improvement of claim 22 wherein a portion of the high-pressure steam is passed in heat exchange relation with a fluid requiring heat, and the water condensate resulting from said heat exchange is added to the condensate separated from the fuel gas.

* * * * *